(12) United States Patent
Gasworth

(10) Patent No.: US 10,569,493 B2
(45) Date of Patent: Feb. 25, 2020

(54) ENCLOSURE WITH A CONDENSATION-RESISTANT INTERIOR SURFACE

(71) Applicant: SABIC GLOBAL TECHNOLOGIES B.V., Bergen op Zoom (NL)

(72) Inventor: Steven Marc Gasworth, Wixom, MI (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 158 days.

(21) Appl. No.: 15/521,706

(22) PCT Filed: Nov. 11, 2015

(86) PCT No.: PCT/IB2015/058721
§ 371 (c)(1),
(2) Date: Apr. 25, 2017

(87) PCT Pub. No.: WO2016/083931
PCT Pub. Date: Jun. 2, 2016

(65) Prior Publication Data
US 2017/0254503 A1     Sep. 7, 2017

Related U.S. Application Data

(60) Provisional application No. 62/083,451, filed on Nov. 24, 2014.

(51) Int. Cl.
*B32B 1/02* (2006.01)
*F21S 41/00* (2018.01)
(Continued)

(52) U.S. Cl.
CPC ................ *B32B 1/02* (2013.01); *F21S 41/00* (2018.01); *F21S 41/20* (2018.01); *F21S 41/25* (2018.01);
(Continued)

(58) Field of Classification Search
CPC .. F21S 41/00; F21S 41/20; F21S 41/25; F21S 41/255; F21S 41/265; F21S 41/275;
(Continued)

(56) References Cited

U.S. PATENT DOCUMENTS 5,435,376 A    7/1995  Hart
6,220,739 B1   4/2001  Tatsuhiko et al.
(Continued)

FOREIGN PATENT DOCUMENTS

CN    102248722 A    11/2011
CN    203868879 U    10/2014
(Continued)

OTHER PUBLICATIONS

Elgafy et al.; "Effect of carbon nanofiber additives on thermal behavior of phase change materials"; Carbon 43; 2005; pp. 3067-3074.
(Continued)

*Primary Examiner* — Walter Aughenbaugh
(74) *Attorney, Agent, or Firm* — Cantor Colburn LLP

(57) ABSTRACT

In an embodiment, an enclosure comprises walls forming the enclosure, wherein the enclosure comprises an internal space; an inhibiting element disposed in at least one wall, the inhibiting element having an internal inhibiting surface exposed to the internal space, wherein the inhibiting element has a transparency of greater than or equal to 20%; and a condensing element disposed in at least one other wall, the condensing element having an internal condensing surface exposed to the internal space; wherein at least one of the inhibiting element and the condensing element comprise a phase change material configured to form a temperature differential between an internal inhibiting surface temperature and an internal condensing surface temperature over a temperature range, and wherein when the temperature dif- (Continued)

ferential is formed, the internal inhibiting surface temperature is greater than the internal condensing surface temperature.

18 Claims, 6 Drawing Sheets

(51) Int. Cl.
| | |
|---|---|
| F21S 45/00 | (2018.01) |
| F21S 45/33 | (2018.01) |
| F21S 41/20 | (2018.01) |
| F21V 3/10 | (2018.01) |
| F21S 45/47 | (2018.01) |
| F21V 15/01 | (2006.01) |
| F21S 41/25 | (2018.01) |
| F21S 41/275 | (2018.01) |
| F21V 23/00 | (2015.01) |
| F21S 45/10 | (2018.01) |

(52) U.S. Cl.
CPC .............. *F21S 41/275* (2018.01); *F21S 41/28* (2018.01); *F21S 45/00* (2018.01); *F21S 45/33* (2018.01); *F21S 45/47* (2018.01); *F21V 3/10* (2018.02); *F21V 15/01* (2013.01); *F21V 23/001* (2013.01); *F21S 45/10* (2018.01)

(58) Field of Classification Search
CPC .......... F21S 41/29; F21V 45/00; F21V 45/60; F21V 45/70; B32B 1/02
See application file for complete search history.

(56) References Cited

U.S. PATENT DOCUMENTS

| | | |
|---|---|---|
| 6,270,836 B1 | 8/2001 | Holman |
| 8,236,383 B2 | 8/2012 | Gasworth et al. |
| 2003/0113556 A1 | 6/2003 | Feng et al. |
| 2003/0194537 A1 | 10/2003 | Bhagwagar et al. |
| 2005/0258394 A1 | 11/2005 | Bacher et al. |
| 2006/0124892 A1 | 6/2006 | Rolland et al. |
| 2007/0290392 A1 | 12/2007 | Lawton |
| 2008/0008858 A1 | 1/2008 | Hong et al. |
| 2008/0014451 A1 | 1/2008 | Metz et al. |
| 2010/0244495 A1 | 9/2010 | Lawall et al. |
| 2011/0286228 A1 | 11/2011 | Yasuyuki et al. |
| 2013/0070470 A1 | 3/2013 | Yang |
| 2013/0134347 A1 | 5/2013 | Edgar et al. |
| 2014/0043844 A1 | 2/2014 | Yang et al. |
| 2015/0321456 A1 | 11/2015 | Gasworth |
| 2015/0343752 A1 | 12/2015 | Gasworth |
| 2017/0058175 A1 | 2/2017 | Gasworth |

FOREIGN PATENT DOCUMENTS

| | | |
|---|---|---|
| DE | 102009013941 A1 | 9/2010 |
| EP | 1493777 B1 | 11/2007 |
| EP | 2966412 A1 | 1/2016 |
| FR | 2823466 A1 | 10/2002 |
| JP | 2006150953 A | 6/2006 |
| JP | 2011168988 A | 9/2011 |
| JP | 2013258141 A | 12/2013 |

OTHER PUBLICATIONS

Gasworth et al.; "Reduced Steady State Heating and Air Conditioning Loads via Reduced Glazing Thermal Conductivity"; SAE International; 2011; 8 pages.

Huang et al.; "Phase change materials for limiting temperature rise in building integrated photovoltaics"; Science Direct; Solar Energy 80; (2006); pp. 1121-1130.

International Search Report for International Application No. PCT/IB2015/058721; International Filing Date Nov. 11, 2015; dated Mar. 11, 2016; 5 pages.

Liraut et al.; "Plastics glazing—the match to meet the OEM's expectations and the polycarbonate opportunities"; VDI Verlag GmbH—Dusseldorf 2012; 6 pages.

Peng et al.; "Polymeric Phase Change Composites for Thermal Energy Storage"; Journal of Applied Polymer Science; vol. 93; pp. 1240-1251; (2004).

Pickett et al.; "Effects of temperature on the weathering of engineering thermoplastics"; Science Direct; Polymer Degradation and Stability 93; (2008); pp. 664-691.

Sanusi et al.; "Energy storage and solidification of paraffin phase change material embedded with graphite nanofibers"; International Journal of Heat and Mass Transfer 54; 2011; pp. 4429-4436.

Schossig et al.; "Micro-encapsulated phase-change materials integrated into construction materials"; Solar Energy Materials & Solar Cells 89; (2005); pp. 297-306.

The Compleat Sculptor Waxes; Slab and Chunk Waxes; Oct. 20, 2000; pp. 1-2; http://www/sculpt.com/catalog_98/Wax/Micro.htm.

Voelker et al.; "Temperature reduction due to the application of phase change materials"; Science Direct; Energy and Buildings 40; (2008); pp. 937-944.

Written Opinion of the International Search Report for International Application No. PCT/IB2015/058721; International Filing Date Nov. 11, 2015; dated Mar. 11, 2016; 8 pages.

Hasenohrl, "An Introduction to Phase Change Material as Heat Storage Mediums," Project Report, 2009 MVK 160 Heat and Mass Transport, May 9, 2009 Lund, Sweden.

Carey T., "Chemical Control of Thermal Expansion in Zeolites with the LTA Topology," University of Bermingham. Apr. 2013, pp. 1-4.

ENCLOSURE WITH A CONDENSATION-RESISTANT INTERIOR SURFACE

CROSS REFERENCE TO RELATED APPLICATIONS

This application is a National Stage application of PCT/IB2015/058721, filed Nov. 11, 2015, which claims the benefit of U.S. Provisional Application No. 62/083,451, filed Nov. 24, 2014, both of which are incorporated by reference in their entirety herein.

TECHNICAL FIELD

The present disclosure relates to enclosures with a condensation-resistant interior surface.

BACKGROUND

Condensation, such as in the form of droplets on the interior surface of a lens of an enclosed lamp enclosure, for example, on the interior surface of a vehicle headlight, affects a lamp's function. Condensation can affect both a user's perception of lamp quality when the enclosure is in view, such as when a vehicle his parked and its headlamp is in view. Condensation can also affect photometric performance, undesirably refracting light. Condensation can be inhibited or condensate can be evaporated from a lens if the lamp enclosure is warm, but in some lamp enclosures, such as those using low heat-generating light sources, such as lamps that include light emitting diodes (LEDs), lamp operation may not generate enough heat at the lens to inhibit condensation or to clear condensate away.

Both active and passive approaches have been used in an attempt to reduce condensation in lamp enclosures. Active approaches can involve supplying electrical power to an electrical conductor that is in thermal contact with the enclosure to heat the enclosure. This approach can be expensive, at least because it relies on additional parts and manufacturing steps. Further, if the active element is part of the lens, it can affect photometric performance. Also, such an approach does not adequately address the problem of condensation in an unpowered car, where the vehicle is not actively heating the enclosure.

Passive approaches can include anti-fog agents or treatments applied on the interior surface of the lens to improve wetting, that is, to inhibit formation of small droplets and to thereby reduce light scattering. Such agents or treatments are designed to minimize the optical effects of condensation by favoring water films over water droplets; they are not designed to inhibit condensation on the lens, so there remains the potential for photometric variability according to environmental conditions. Moreover, additional manufacturing steps and costs are involved. Another passive approach is to design the lamp enclosure so as to direct the relatively low level of LED-generated heat to the lens, but this approach involves extra constraints on design.

An improved enclosure with a reduced propensity for condensation on selected surfaces of the enclosure is therefore desired.

BRIEF DESCRIPTION

Disclosed herein is an enclosure comprising a surface with a reduced propensity for condensation thereon.

In an embodiment, an enclosure comprises walls forming the enclosure, wherein the enclosure comprises an internal space; an inhibiting element disposed in at least one wall, the inhibiting element having an internal inhibiting surface exposed to the internal space, wherein the inhibiting element has a luminous transmittance of greater than or equal to 20%, specifically, greater than or equal to 40%, more specifically, greater than or equal to 60%, even more specifically, greater than or equal to 80% as determined in accordance with ASTM D1003-11, Procedure A using CIE standard illuminant C; and a condensing element disposed in at least one other wall, the condensing element having an internal condensing surface exposed to the internal space; wherein at least one of the inhibiting element and the condensing element comprise a phase change material configured to form a temperature differential between an internal inhibiting surface temperature and an internal condensing surface temperature over a temperature range, and wherein when the temperature differential is formed, the internal inhibiting surface temperature is greater than the internal condensing surface temperature.

In an embodiment, a method of directing a condensation in the enclosure comprises creating a temperature differential between an internal inhibiting surface and an internal condensing surface.

In an embodiment, a method of forming the enclosure comprises forming a wall comprising an inhibiting element; forming another wall comprising a condensing element; and orienting the walls to form the enclosure.

In an embodiment, a visible light illuminating device comprises an enclosure, wherein a wall comprising an inhibiting element is a lens, wherein the enclosure comprises a bezel portion and a housing portion, and wherein at least one of the bezel portion and the housing portion comprise the condensing element; an electrical connection configured to electrically connect with a light source; and wiring connected to the light source and configured to provide electricity to the light source.

In an embodiment, a lamp enclosure comprises a bezel; a socket configured to receive a light source; a reflector coupled with the bezel and positioned to reflect light from the light source; and a lens coupled to the bezel; wherein at least one of the bezel and the lens includes a phase change material.

In an embodiment, a lamp enclosure, comprising: a bezel; a first lens coupled to the bezel; and an optional second lens coupled to the bezel, wherein the bezel extends around a perimeter of both of the first lens and the optional second lens, and wherein at least one of the bezel and the first lens includes a phase change material.

The above described and other features are exemplified by the following figures and detailed description.

BRIEF DESCRIPTION OF THE DRAWINGS

The following is a brief description of the drawings wherein like elements are numbered alike and which are presented for the purposes of illustrating the exemplary embodiments disclosed herein and not for the purposes of limiting the same.

DETAILED DESCRIPTION

Figure 1:
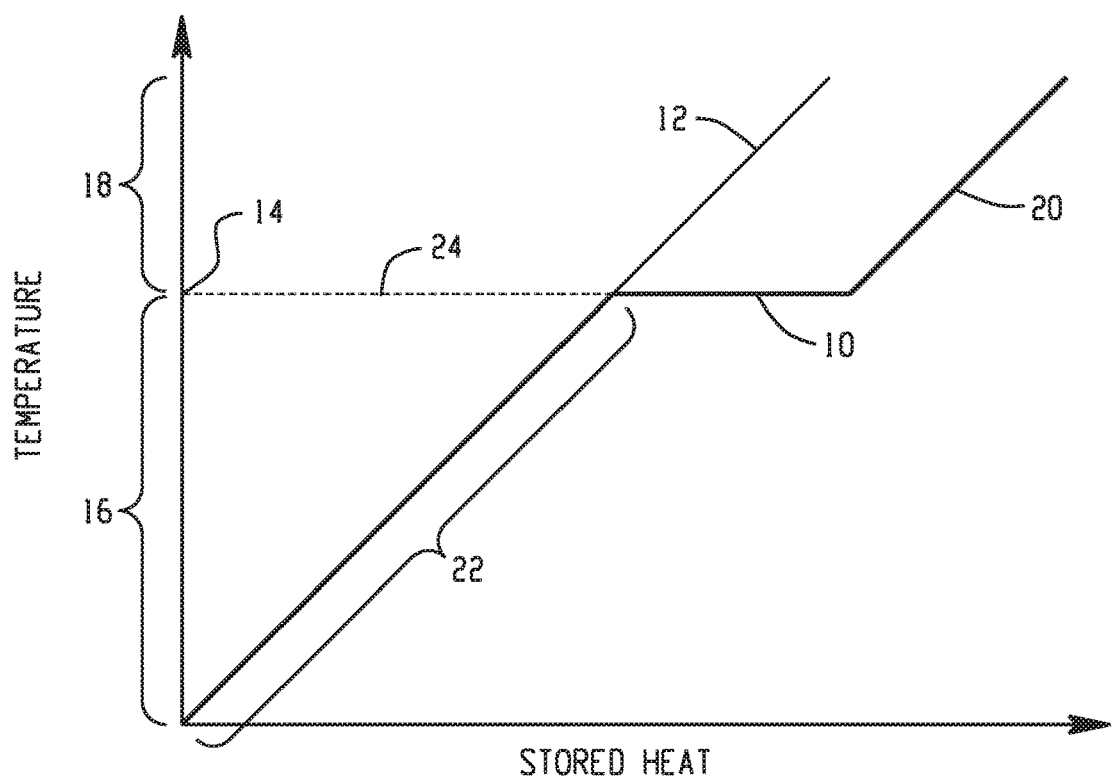
FIG. 1 is a graphical illustration of temperature versus stored heat for an inhibiting surface that is free of a phase change material (PCM) and a condensing surface that includes a PCM.

Enclosures, such as lamp enclosures, have an amount of water entrapped therein. Under various environmental conditions, the water can condense on the inner surface of the enclosure. The condensation can be visually unappealing. The condensation can result in a reduced photometric performance in the case of lamp enclosures. While both active and passive methods have been developed to reduce the propensity for condensation, improved methods are desired.

Accordingly, disclosed herein is an enclosure that includes walls forming the enclosure, an inhibiting element disposed in at least one wall, the inhibiting element having an internal inhibiting surface exposed to an internal space, and a condensing element disposed in at least one other wall, the condensing element having an internal condensing surface exposed to the internal space; wherein at least one of the inhibiting element and the condensing element comprise a PCM configured to form a temperature differential between an internal inhibiting surface temperature and an internal condensing surface temperature over a temperature range, and wherein when the temperature differential is formed, the internal inhibiting surface temperature is greater than the internal condensing surface temperature. As used herein, a PCM is a material that undergoes a phase change at its phase change temperature (PCT), where it absorbs energy as latent heat without an increase in temperature, and releases heat without a decrease in temperature.

The enclosure can be a lamp enclosure. Lamp enclosures can form compound surfaces that include multiple regions, such as multiple planar regions, or a mix of planar and non-planar regions. Different regions can be formed of different parts. Different regions can be formed of a monolithic part. Different regions can be formed of the same monolithic part. A region can include a PCM. Multiple regions can include the same PCM. Multiple regions can include different PCMs.

The temperature differential can arise from heat provided from a heat source. Sources of the heat that can be stored as latent heat (manifested by phase change) and sensible heat (manifested by temperature rise) can include solar radiation and ambient temperature. A heat source can include a lamp. A heat source can include an auxiliary heat source integral to the lamp enclosure. A heat source can include a heat source in an engine compartment. By incorporating one or more PCMs into at least one of the condensing element and the inhibiting element, the Applicants found that they could selectively localize condensation of entrapped moisture onto the internal condensing surface.

The internal inhibiting surface and the internal condensing surface each independently can span greater than or equal to 10% of the internal surface area of the inhibiting element and the condensing elements, respectively. The internal inhibiting surface and the internal condensing surface each independently can span greater than or equal to 80% of the internal surface area of the inhibiting element and the condensing elements, respectively. The internal inhibiting surface and the internal condensing surface each independently can span greater than or equal to 90% of the internal surface area of the inhibiting element and the condensing elements, respectively. The internal inhibiting surface and the internal condensing surface each independently can span 95 to 100% of the internal surface area of the inhibiting element and the condensing elements, respectively. Condensation can be localized to a region by selecting one or more PCMs to form regions to promote a temperature differential between regions in use. The temperature differential between the inhibiting surface and the condensing surface directs condensation toward the condensing surface. This directed condensation occurs by using a PCM to maintain the condensing surface at a temperature lower than the temperature of the inhibiting surface through a temperature range.

It is noted that this directed condensation is further supported if both air exchange between the ambient and the interior of the enclosure (e.g., due to vents or to imperfect sealing of the enclosure) and diffusion of moisture through or from within the walls of the enclosure occur more slowly than temperature changes sufficient to influence condensation. For example, such temperature changes can occur in an enclosure for automotive lighting over a time scale of tens of minutes as a heat source acts on the enclosure. Under these conditions a condensing surface can play the role of a desiccant, depleting air-borne moisture in the enclosure more rapidly than it can be replaced by air exchange with the ambient or by diffusion of moisture from enclosure walls into the enclosure.

The enclosure includes walls forming the enclosure, wherein the enclosure comprises an internal space; an inhibiting element disposed in at least one wall of the enclosure, the inhibiting element having an internal inhibiting surface exposed to the internal space and a condensing element disposed in at least one other wall, the condensing element having an internal condensing surface exposed to the internal space, wherein 1) only a condensing element includes a PCM; 2) only an inhibiting element includes a PCM; or 3) the PCM includes a high PCT PCM and a low PCT PCM and wherein an inhibiting element includes the high PCT PCM and a condensing element includes the low PCT PCM.

FIG. 1 illustrates temperature trajectories of an inhibiting surface (segments 22 and 12) and a condensing surface (bold line, segments 22, 10, and 20) of the interior of an enclosure, where the inhibiting element is free of a PCM and the condensing element includes a PCM. In FIG. 1, stored heat is illustrated along the x-axis, with increasing surface temperature illustrated on the y-axis from a cold temperature range 16 to a hot temperature range 18. Increasing the temperature from a common low temperature along segment 22, the temperature of both the condensing surface and the inhibiting surface increases until the condensing PCT 14 of the PCM is reached, which is illustrated where the dashed line 24 intersects with the y-axis. Once the condensing PCT 14 of the PCM is reached from lower temperatures, the heat storage in the condensing element in the form of latent heat increases and the temperature follows a temperature plateau 10 at the condensing PCT 14, while the temperature of the inhibiting surface increases continuously on segment 12. Eventually, the condensing element resumes sensible heat storage, indicated by trajectory segment 20 in FIG. 1, which reflects the finite latent heat storage capacity of a finite volume of the PCM.

As can be seen in FIG. 1, as surfaces of the enclosure warm from a common initial temperature below the condensing PCT 14, the temperature of the condensing surface reaches a plateau at the condensing PCT 14 while the inhibiting surface continues to warm. The temperature of the condensing surface of the condensing element that includes a PCM can therefore be less as compared to the temperature of the inhibiting surface of the inhibiting element that is free of a PCM. The result is that the instantaneous temperature of the condensing surface is generally lower than that of the inhibiting surface and the moisture in the enclosure will preferentially condense or persist on the condensing surface due to its lower temperature. For example, the conditions of the internal space can be such that there is condensation on both the inhibiting surface and the condensing surface. As the temperature of the internal space increases, the temperature of the inhibiting surface can be greater than the temperature of the condensing surface, and condensation on the inhibiting surface can be reduced due to evaporation, while the condensation on the condensing surface can persist. It is noted that the PCT of FIG. 1 can be low relative to the range of temperatures of the surfaces inside the enclosure typical of warming scenarios in which condensate can persist on an inhibiting surface in the absence of PCM. When applied to lamp enclosures, this embodiment allows for the lens, which is subject to manifold processing and optical requirements, to be the inhibiting element that is free of a PCM.

Figure 2:
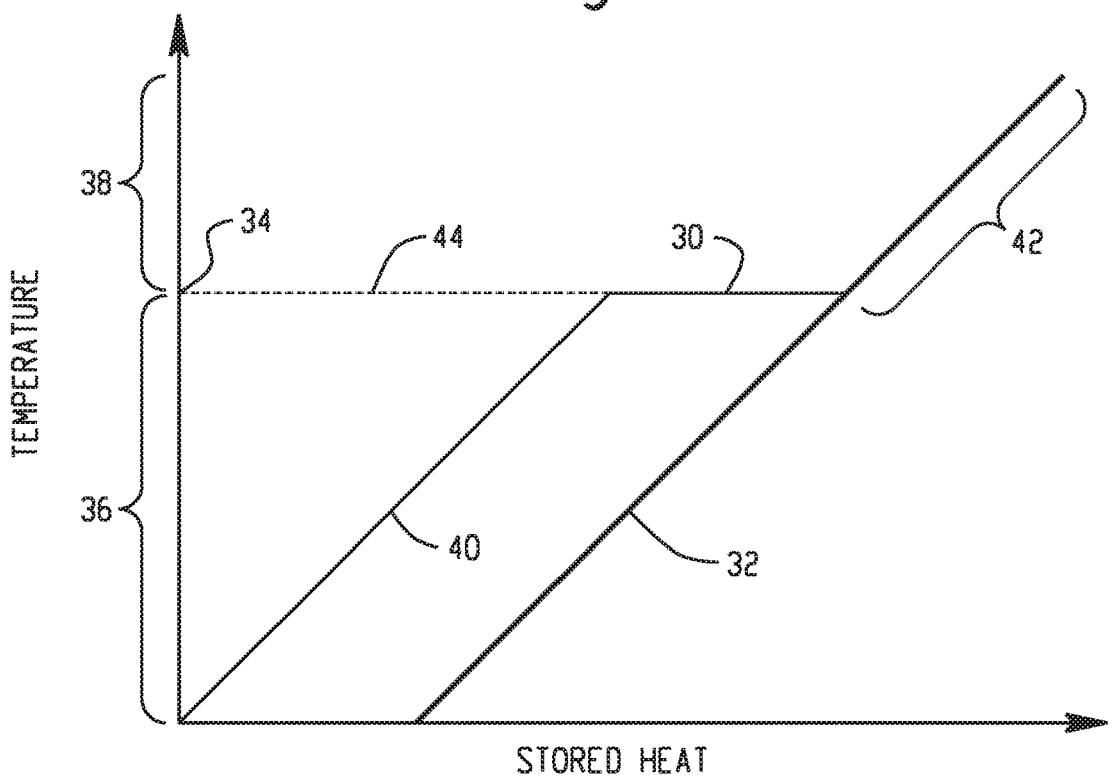
FIG. 2 is a graphical illustration of temperature versus stored heat for an inhibiting surface that includes a PCM and a condensing surface that is free of a PCM.

FIG. 2 illustrates temperature trajectories of an inhibiting surface (segments 42, 30, and 40) and a condensing surface (bold line, segments 42 and 32), where the inhibiting element includes a PCM and the condensing element is free of a PCM. In FIG. 2, stored heat is illustrated along the x-axis, with increasing temperature illustrated on the y-axis from a cold temperature range 36 to a hot temperature range 38. Decreasing the temperature from a common high temperature along segment 42, the temperature of both the condensing surface and the inhibiting surface decreases until the inhibiting PCT 34 of the PCM is reached, which is illustrated where the dashed line 44 intersects with the y-axis. Once the inhibiting PCT 34 of the PCM is reached from higher temperatures, the heat storage in the inhibiting element in the form of latent heat decreases and the temperature follows a temperature plateau 30 at the inhibiting PCT 34, while the temperature of the condensing surface decreases continuously on segment 32. Eventually, the inhibiting element resumes sensible heat loss, indicated by trajectory segment 40 in FIG. 2, which reflects the finite latent heat storage capacity of a finite volume of the PCM.

As can be seen in FIG. 2, as surfaces of the enclosure cool down from a common temperature above inhibiting PCT 34, for example, due to a temperature drop of the ambient, atmosphere external to the enclosure, the temperature of the inhibiting surface reaches a plateau at inhibiting PCT 34 while the condensing surface continues to cool down. The temperature of the condensing surface of the condensing element that is free of a PCM can therefore be less as compared to the temperature of the inhibiting surface of the inhibiting element with the inclusion of a PCM. The result is that the instantaneous temperature of the condensing surface is generally lower than that of the inhibiting surface and the moisture in the enclosure will preferentially condense on the condensing surface due to its lower temperature. It is noted that the PCT of FIG. 2 can be high relative to the range of saturation temperatures (dew points) of the air inside the enclosure typical of cooling scenarios that lead to condensation on inhibiting surfaces in the absence of PCM. An inhibiting surface on an inhibiting element that includes a PCM and a condensing surface of a condensing element that is free of a PCM can be useful for an enclosure that will experience cool down from an elevated daytime or operating temperature.

Figure 3:
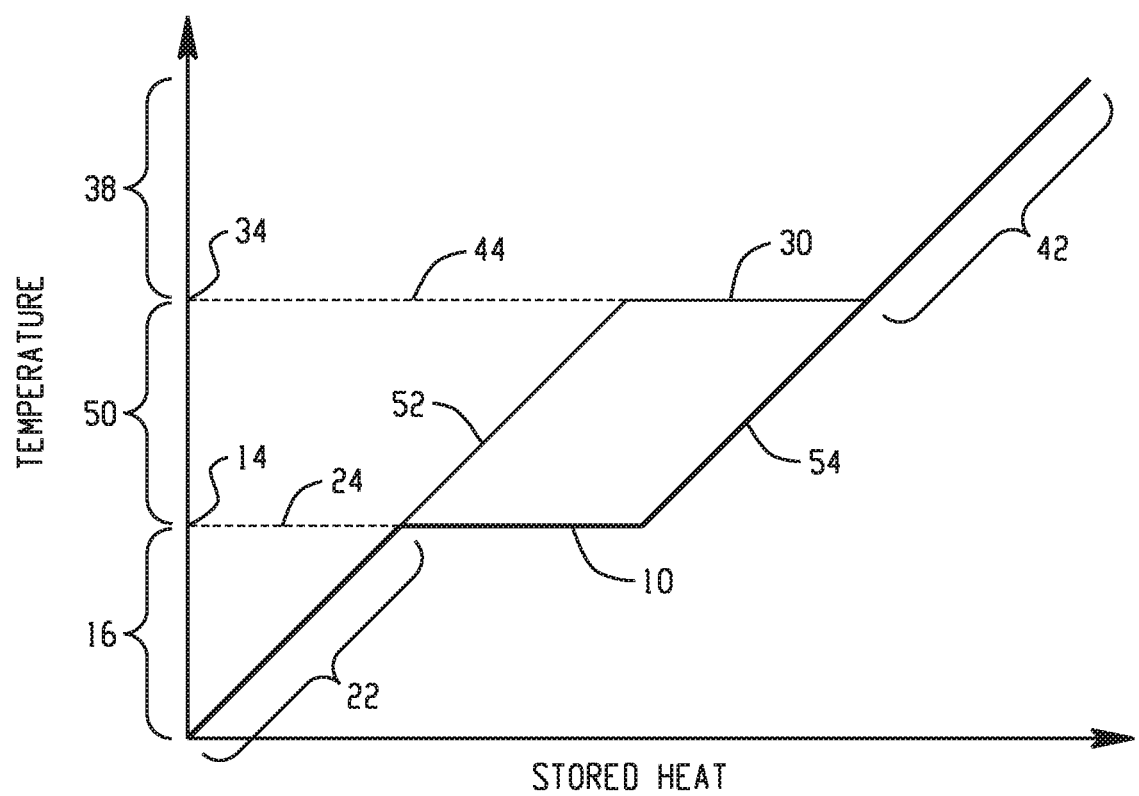
FIG. 3 is a graphical illustration of temperature versus stored heat for an inhibiting surface that includes a PCM and a condensing surface that includes a PCM.

FIG. 3 illustrates temperature trajectories of an inhibiting surface (segments 22, 52, 30, and 42) and a condensing surface (bold line, segments 42, 54, 10, and 22), where the inhibiting element includes a high PCT PCM that exhibits an inhibiting PCT 34 and the condensing element includes a low PCT PCM that exhibits a condensing PCT 14. In FIG. 3, stored heat is illustrated along the x-axis, with increasing temperature illustrated on the y-axis from a cold temperature range 16 to a mid-temperature range 50 to a hot temperature range 38. Increasing the temperature from a common low temperature along segment 22, the temperature of both the condensing surface and the inhibiting surface increases until the condensing PCT 14 of the condensing PCM is reached, which is illustrated where the dashed line 24 intersects with the y-axis. Once the condensing PCT 14 of the PCM is reached from lower temperatures, the heat storage in the condensing element in the form of latent heat increases and the temperature of the condensing surface follows a temperature plateau 10 at the condensing PCT 14, while the temperature of the inhibiting surface increases continuously on segment 52. The temperature of the inhibiting surface increases until the inhibiting PCT 34 is reached. At this point, the temperature of the inhibiting surface remains constant over temperature plateau 30 until the inhibiting element resumes sensible heat storage as indicated by trajectory segment 42, which reflects the finite latent heat storage capacity of a finite volume of the PCM. The condensing surface follows a temperature plateau 10 until the condensing element resumes sensible heat storage, indicated by trajectory segments 54 and 42 in FIG. 3, which reflects the finite latent heat storage capacity of a finite volume of the PCM.

Likewise, FIG. 3 illustrates that decreasing the temperature from a common high temperature along segment 42, the temperature of both the condensing surface and the inhibiting surface decreases until the inhibiting PCT 34 of the PCM is reached, which is illustrated where the dashed line 44 intersects with the y-axis. Once the inhibiting PCT 34 of the PCM is reached from higher temperatures, the heat storage in the inhibiting element in the form of latent heat decreases and the temperature follows a temperature plateau 30 at the inhibiting PCT 34, while the temperature of the condensing surface decreases continuously on segment 54. The temperature of the condensing surface decreases until the condensing PCT 14 is reached. At this point, the temperature of the condensing surface remains constant over temperature plateau 10 until the condensing element resumes sensible heat loss as indicated by trajectory segment 22, which reflects the finite latent heat storage capacity of a finite volume of the PCM. The inhibiting surface follows a temperature plateau 30 until, the inhibiting element resumes sensible heat loss, indicated by trajectory segments 52 and 22 in FIG. 3, which reflects the finite latent heat storage capacity of a finite volume of the PCM.

The condensing PCT and the inhibiting PCT can be chosen such that they roughly bracket a practical range of saturation temperatures. Over this range, the high PCT PCM and the low PCT PCM yield a divergence in temperatures of the inhibiting surface and the condensing surface, such that condensation is favored on the condensing surface at the expense of condensation on the inhibiting surface under the conditions noted above on air exchange and internal sources of moisture.

It is noted that while FIGS. 1-3 illustrate PCM incorporation with a single PCT in at least one of the elements, multiple PCMs can be incorporated into an element. Likewise, regarding FIG. 3, it is noted that while FIG. 3 illustrates an embodiment where the high PCT PCM and the low PCT PCM are capable of storing the same amount of latent heat, it is understood that one material can be capable of storing more latent heat that the other, for example, due to its inherent storage capacity or by varying the relative amount of PCM in the element. Further regarding FIG. 3, it is noted that the respective PCMs in the elements and the amounts are chosen such that the temperature of the condensing surface is less than or equal to the temperature of the inhibiting surface for a given value of stored heat.

Further regarding FIGS. 2 and 3, it is noted that when a PCM is incorporated into the inhibiting element of a lens in a lamp enclosure, where the lens has an external side exposed to the ambient environment, then the PCM can be selected such that its PCT is above the freezing temperature of water (i.e., the PCT is greater than 0° C.). In this manner, the presence of the PCM in the lens element can hinder ice formation on its external surface as the lens temperature, that would otherwise drop below the water freezing temperature (e.g., due to a reduction in ambient temperature or because an internal heat source (such as the LED or engine) was switched off), would remain elevated through the duration of the phase change of the PCM.

When the inhibiting element comprises an inhibiting element PCM, the inhibiting element PCM can have an inhibiting PCT of greater than 0° C., or is in the range of 5° C. to 25° C., or is in the range of 10° C. to 20° C. When the condensing element comprises a condensing element PCM, the condensing element PCM can have a condensing PCT of less than 25° C., or is in the range of 0° C. to 20° C., or is in the range of 5° C. to 15° C.

When an element includes a PCM, the PCM can be uniformly or non-uniformly dispersed throughout the element. Uniformly dispersed or uniformly distributed refers to an element that is prepared by thoroughly mixing a PCM in, for example, a polymer matrix and then forming the element. When the PCM is non-uniformly dispersed, the PCM can, for example, be localized within the element proximal to the internal surface of the enclosure, where the internal surface of an element can have a high concentration of PCM and the external surface of the element can have a lower concentration of the PCM. For example, non-uniformly dispersed can mean that greater than 50 wt % of the PCM is localized closer to the internal surface than to the external surface. Non-uniformly dispersed can mean that greater than 60 wt % of the PCM is localized closer to the internal surface than to the external surface. Non-uniformly dispersed can mean that greater than 75 wt % of the PCM is localized closer to the internal surface than to the external surface. Likewise, an element can include a PCM that is located in a discrete location, for example, in a discrete layer located on an internal surface of an element of the enclosure, where the discrete PCM layer is a layer (e.g. a coating layer) that includes a PCM. The discrete PCM layer can be either or both of thermally and mechanically coupled to the underlying surface. The discrete PCM layer can be loosely mechanically coupled to the underlying surface such that the layer can be periodically removed and replaced. The discrete PCM layer can be loosely thermally coupled to the underlying surface such that the temperature of the discrete layer manifests the plateau region while the underlying surface continues to change temperature.

The PCM can be concentrated at a surface, via an in-mold coating, a cap layer, or a film-insert-molded layer that incorporates the PCM.

The enclosures disclosed herein can be used in various applications including, but not limited to, use in vehicles (such as automobiles, trains, aircraft, and watercraft); indoor applications (e.g., display cases); outdoor applications including, but not limited to, building and construction (e.g., buildings, stadiums, greenhouses, etc.). The enclosure can be used as a lamp enclosure, for example, as a headlamp, a roof light, a door light, a ceiling light, a flashlight, and the like. The enclosure can be a lamp enclosure, such as an encasing and can include at least one of a bezel and a reflector.

A visible illuminating device can comprises the enclosure, wherein the wall comprising the inhibiting element is a lens, wherein the enclosure comprises a housing portion and a bezel portion, and wherein at least one of the housing portion and the bezel portion comprise the condensing element; a light source; an electrical connection configured to electrically connect with a light source; and wiring connected to the light source and configured to provide electricity to the light source. The device can comprise a reflector, wherein the reflector is in optical communication with the light source. The electrical connection can comprise a socket and/or pins.

When the enclosure is a lamp enclosure, the lamp enclosure can include a bezel, and a socket configured to receive a light source; a reflector coupled with the bezel and positioned to reflect light from the light source; and a lens coupled to the bezel. At least one of the bezel and the lens can include a PCM. The lamp enclosure can include a bezel; a first lens coupled to the bezel; and an optional second lens coupled to the bezel, wherein the bezel extends around a perimeter of both of the first lens and the optional second lens, and wherein at least one of the bezel and the first lens includes a PCM.

Figure 4:
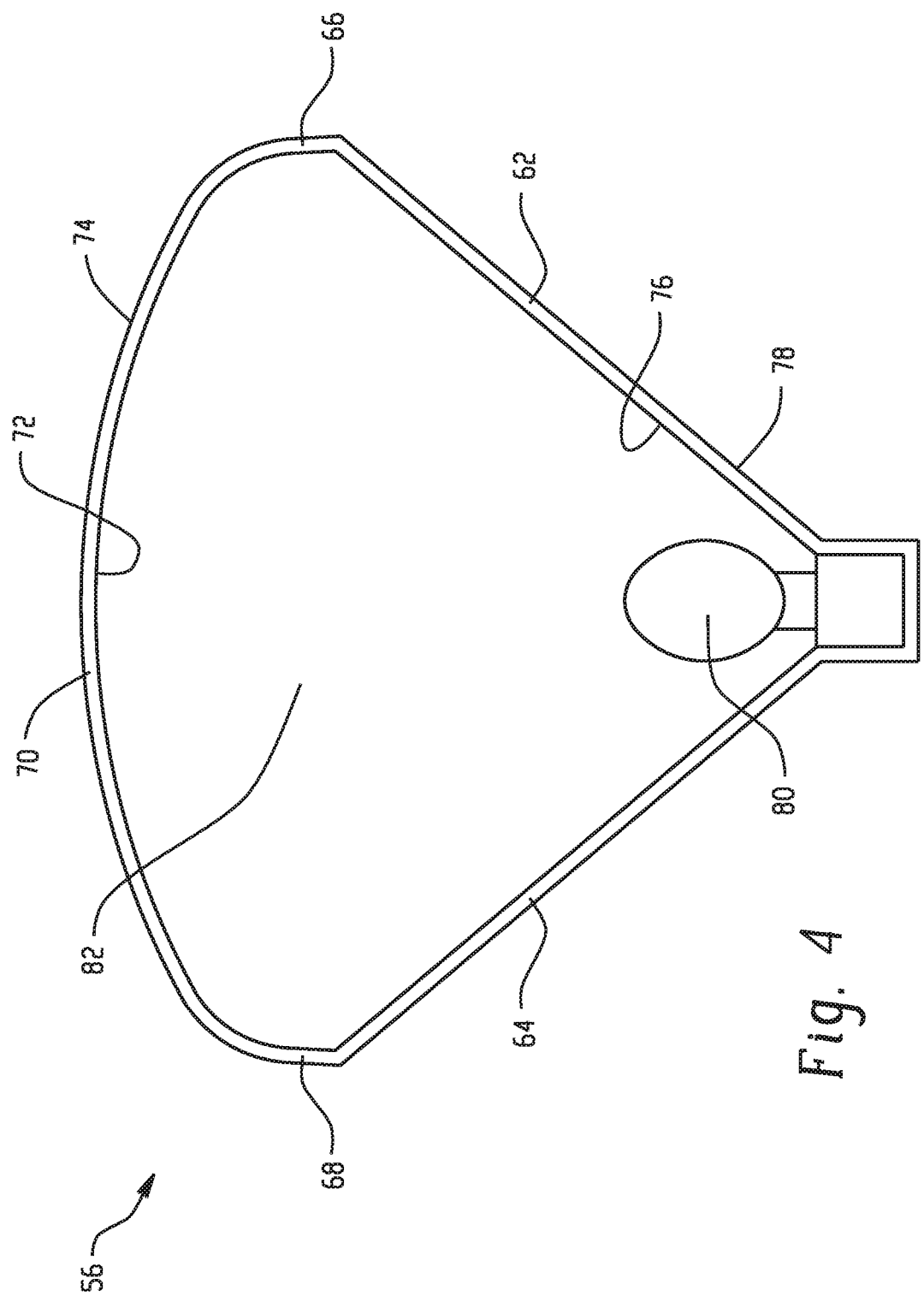
FIG. 4 is an illustration of cross-section of an enclosed headlamp including a condensing surface and an inhibiting surface.

FIG. 4 is an illustration of a cross-section of lamp enclosure 56 including light source 80 enclosed in internal space 82. Lamp enclosure 56 includes condensing elements 62 and 64 (such as bezel(s)), elements 66 and 68 that can be condensing elements or inhibiting elements, and inhibiting element 70 (such as a lens). At least one of condensing elements 62 and 64 can include a PCM; inhibiting element 70 can include a PCM; or the PCM can include a high PCT PCM and a low PCT PCM and inhibiting element 70 can include the high PCT PCM and at least one of condensing element 62 and 64 can include the low PCT PCM.

The PCM can be uniformly dispersed in one or more of the elements. The PCM can be non-uniformly dispersed within an element. For example, if the inhibiting element includes a PCM, the PCM can be localized towards internal inhibiting surface 72 as shown in FIG. 4, where greater than 50 wt % of the PCM can be localized closer to internal inhibiting surface 72 than to external inhibiting surface 74. Likewise, if the condensing element 62 includes a PCM, the PCM can be localized towards internal condensing surface 76 as shown in FIG. 4, where greater than 50 wt % of the PCM can be localized closer to internal condensing surface 76 than to external condensing surface 78.

Figure 5:
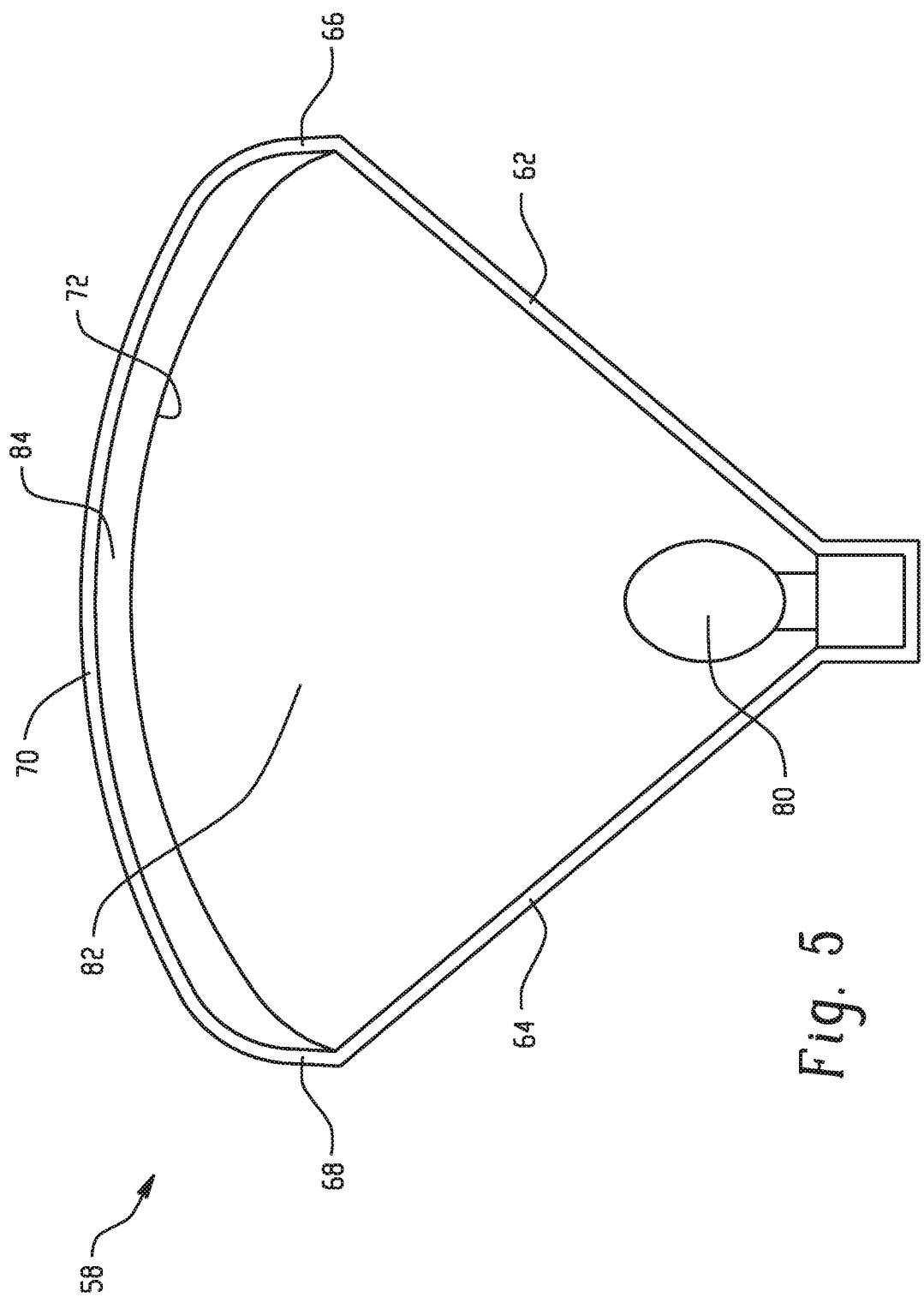
FIG. 5 is an illustration of cross-section of an enclosed headlamp including a condensing surface and an inhibiting surface with a discrete PCM layer.
Figure 6:
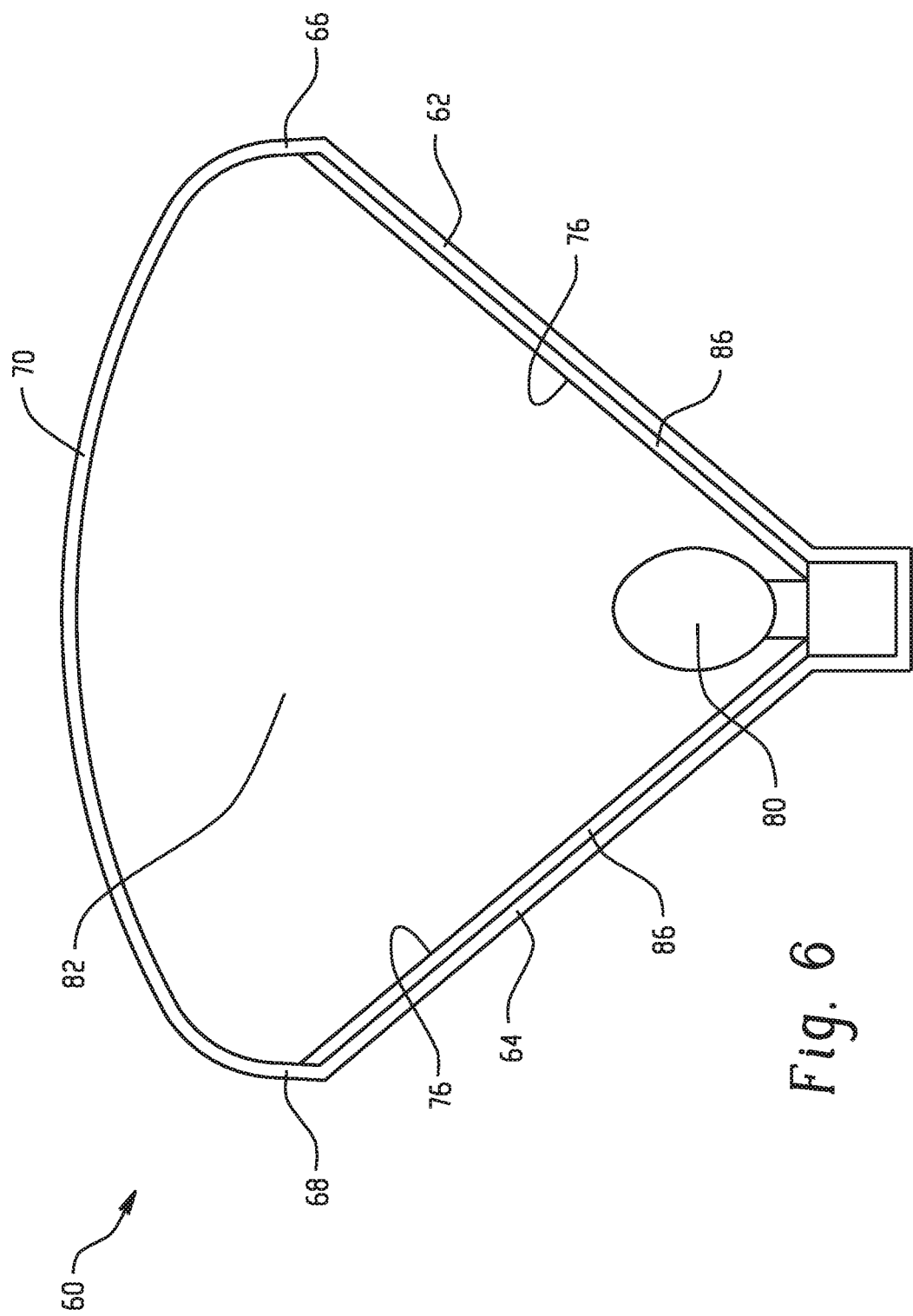
FIG. 6 is an illustration of cross-section of an enclosed headlamp including a condensing surface with a discrete PCM layer and an inhibiting surface.

FIG. 5 is an illustration of a cross-section of an enclosure of lamp enclosure 58 that includes light source 80 enclosed in internal space 82. Lamp enclosure 58 includes discrete PCM layer 84 that includes a PCM. The inhibiting element comprises layer 70 and discrete PCM layer 84 comprising internal inhibiting surface 72 where layer 70 and layer 84 are in direct contact with each other. FIG. 6 is an illustration of a cross-section of an enclosure of lamp enclosure 60 that includes light source 80 enclosed in internal space 82. Lamp enclosure 60 includes discrete PCM layer 86 that includes a PCM. FIG. 6 illustrates that the condensing element comprises layer 62,64 and discrete PCM layer 86 comprising internal condensing surface 76 where layer 62,64 and layer 86 are in direct contact with each other.

Figure 7:
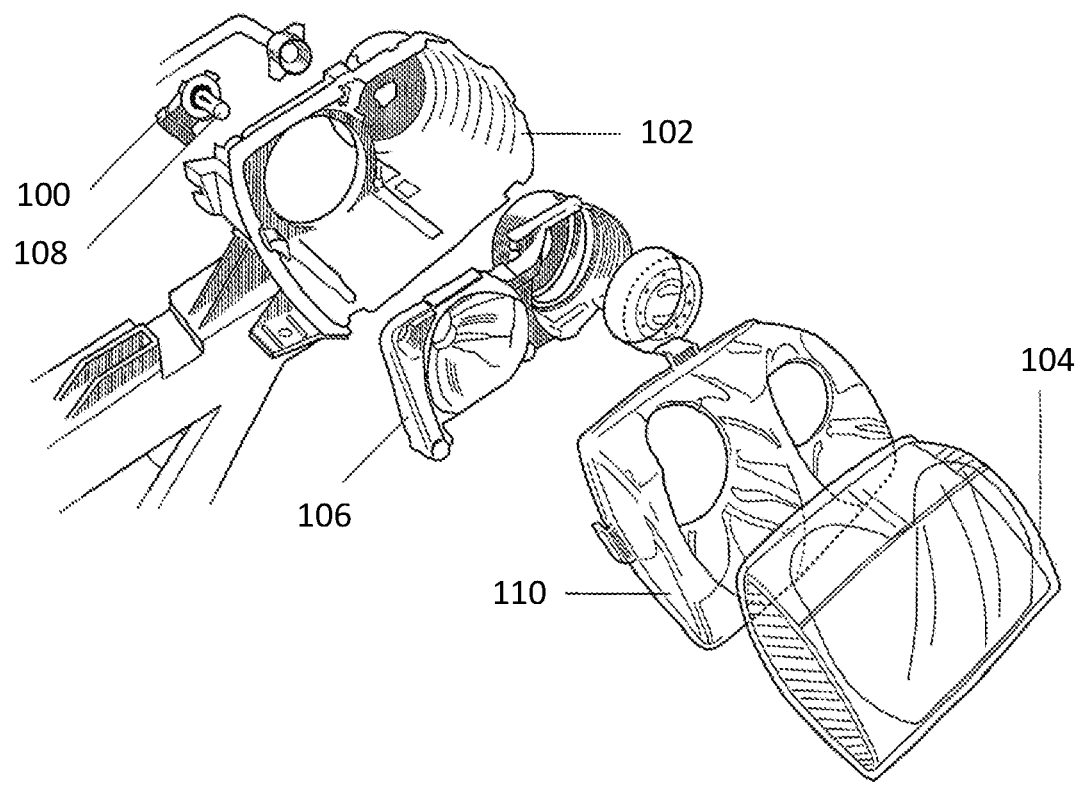
FIG. 7 is an exploded view of a headlamp.

FIG. 7 is an exploded view of a headlamp. The headlamp has a housing 102, which contains reflector assembly 106 (comprising a reflector), light source 108, and electrical connector (e.g., socket) 100 for attachment to the electrical system of a vehicle. Bezel 110 and lens 104 are disposed on the exterior of the housing such that light leaving the housing passes through bezel 110 and lens 104. One or more of housing 102, reflector assembly 106, bezel 110, and lens 104 can comprise a phase change material. It will be appreciated that FIG. 7 shows one specific headlamp design and that numerous alternatives to the actual shape and structure exist. For example, the housing and reflector can be a single component.

The condensing element and the inhibiting element can each individually include a polymer, where the polymer can be the same or different. Possible polymers include, but are not limited to, oligomers, polymers, ionomers, dendrimers, copolymers such as graft copolymers, block copolymers (e.g., star block copolymers, random copolymers, etc.) and combinations comprising at least one of the foregoing. Examples of such polymers include, but are not limited to, polycarbonates (e.g., blends of polycarbonate (such as, polycarbonate-polybutadiene blends, copolyester polycarbonates)), polystyrenes (e.g., polystyrene homopolymers, copolymers of polycarbonate and styrene, polyphenylene ether-polystyrene blends), polyimides (e.g., polyetherimides), acrylonitrile-butadiene-styrene (ABS), polyalkylmethacrylates (e.g., polymethylmethacrylates (PMMA)), polyesters (e.g., copolyesters, polythioesters), polyolefins (e.g., polypropylenes (PP) and polyethylenes, high density polyethylenes (HDPE), low density polyethylenes (LDPE), linear low density polyethylenes (LLDPE)), polyamides (e.g., polyamideimides), polyarylates, polysulfones (e.g., polyarylsulfones, polysulfonamides), polyphenylene sulfides, polytetrafluoroethylenes, polyethers (e.g., polyether ketones (PEK), polyether ether ketones (PEEK), polyethersulfones (PES)), polyacrylics, polyurethanes, polyacetals, polybenzoxazoles (e.g., polybenzothiazinophenothiazines, polybenzothiazoles), polyoxadiazoles, polypyrazinoquinoxalines, polypyromellitimides, polyquinoxalines, polybenzimidazoles, polyoxindoles, polyoxoisoindolines (e.g., polydioxoisoindolines), polytriazines, polypyridazines, polypiperazines, polypyridines, polypiperidines, polytriazoles, polypyrazoles, polypyrrolidines, polycarboranes, polyoxabicyclononanes, polydibenzofurans, polyphthalides, polyacetals, polyanhydrides, polyvinyls (e.g., polyvinyl ethers, polyvinyl thioethers, polyvinyl alcohols, polyvinyl ketones, polyvinyl halides (such as polyvinylchlorides), polyvinyl nitriles, polyvinyl esters), polysulfonates, polysulfides, polyureas, polyphosphazenes, polysilazanes, polysiloxanes, fluoropolymers (e.g., polyvinyl fluoride (PVF), polyvinylidene fluoride (PVDF), fluorinated ethylene-propylene (FEP), polytetrafluoroethylene (PTFE), polyethylenetetrafluoroethylene (PETFE)) and combinations comprising at least one of the foregoing.

More particularly, the polymers can include, but are not limited to, polycarbonate resins (e.g., LEXAN™ resins, commercially available from SABIC'S Innovative Plastics Business), polyphenylene ether-polystyrene resins (e.g., NORYL™ resins, commercially available from SABIC'S Innovative Plastics Business), polyetherimide resins (e.g., ULTEM™ resins, commercially available from SABIC'S Innovative Plastics Business), polybutylene terephthalate-polycarbonate resins (e.g., XENOY™ resins, commercially available from SABIC'S Innovative Plastics Business), copolyestercarbonate resins (e.g., LEXAN™ SLX resins, commercially available from SABIC'S Innovative Plastics Business) polycarbonate/acrylonitrile butadiene styrene resin (e.g., CYCOLOY™, commercially available from SABIC'S Innovative Plastics Business), and combinations comprising at least one of the foregoing resins. Even more particularly, the polymers can include, but are not limited to, homopolymers and copolymers of a polycarbonate, a polyester, a polyacrylate, a polyamide, a polyetherimide, a polyphenylene ether, or a combination comprising at least one of the foregoing resins. The polycarbonate can include copolymers of polycarbonate (e.g., polycarbonate-polysiloxane, such as polycarbonate-polysiloxane block copolymer), linear polycarbonate, branched polycarbonate, end-capped polycarbonate (e.g., nitrile end-capped polycarbonate), and combinations comprising at least one of the foregoing, for example, a combination of branched and linear polycarbonate.

The polycarbonate resins can be aromatic carbonate polymers which can be prepared by reacting dihydric phenol(s) with a carbonate precursor such as phosgene, a haloformate, or a carbonate ester. One example of a polycarbonate which can be used is polycarbonate LEXAN™, commercially available from SABIC'S Innovative Plastics Business. A surface can include bisphenol-A polycarbonate and other resin grades (such as branched or substituted) as well as being copolymerized or blended with other polymers such as polybutylene terephthalate (PBT), poly-(acrylonitrile-butadiene-styrene) (ABS), or polyethylene.

Acrylic polymers can be prepared from monomers such as methyl acrylate, acrylic acid, methacrylic acid, methyl methacrylate, butyl methacrylate, cyclohexyl methacrylate, and the like, as well as combinations comprising at least one of the foregoing. Substituted acrylates and methacrylates, such as hydroxyethyl acrylate, hydroxybutyl acrylate, 2-ethylhexylacrylate, and n-butylacrylate can also be used.

Polyesters can be prepared, for example by the polyesterification of organic polycarboxylic acids (e.g., phthalic acid, hexahydrophthalic acid, adipic acid, maleic acid, terephthalic acid, isophthalic acid, sebacic acid, dodecanedioic acid, and so forth) or their anhydrides with organic polyols containing primary or secondary hydroxyl groups (e.g., ethylene glycol, butylene glycol, neopentyl glycol, and cyclohexanedimethanol).

The polymer can include a polyurethane. Polyurethanes can be prepared by the reaction of a polyisocyanate, with a polyol, polyamine, or water. Examples of polyisocyanates include hexamethylene diisocyanate, toluene diisocyanate, diphenylmethane diisocyanate (MDI), isophorone diisocyanate, and biurets and thisocyanurates of these diisocyanates. Examples of polyols include low molecular weight aliphatic polyols, polyester polyols, polyether polyols, fatty alcohols, and the like. Examples of other materials from which the substrate can be formed include CYCOLAC™ (acrylonitrile-butadiene-styrene, commercially available from SABIC'S Innovative Plastics Business), CYCOLOY™ (a blend of LEXAN™ and CYCOLAC™, commercially available from SABIC'S Innovative Plastics Business), VALOX™ (polybutylene terephthalate, commercially available from SABIC'S Innovative Plastics Business), XENOY™ (a blend of LEXAN™ and VALOX™ commercially available from SABIC'S Innovative Plastics Business), and the like.

At least one of the inhibiting element and the condensing element can include a transparent plastic such as polycarbonate resin, acrylic polymers, polyacrylate, polyester, polysulfone resins, as well as combinations comprising at least one of the foregoing. At least one of the inhibiting element and the condensing element can include an opaque plastic allowing less than or equal to 1% of visible light to transfer through it. At least one of the inhibiting element and the condensing element can include a transparent plastic allowing greater than or equal to 5% of visible light to pass through it. At least one of the inhibiting element and the condensing element can include a transparent plastic allowing greater than or equal to 20% of visible light to pass through it. At least one of the inhibiting element and the condensing element can include a transparent plastic allowing greater than or equal to 50% of visible light to pass through it. At least one of the inhibiting element and the condensing element can include a transparent plastic allowing greater than or equal to 90% of visible light to pass through it. Visible light transmittance can be determined in accordance with the American Society for Testing Materials (ASTM) standard D1003-11, Procedure A using Commission Internationale de L'Eclairage (CIE) standard illuminant C (see e.g., International Standards Organization (ISO) 10526).

The polymers can include various additives ordinarily incorporated into polymer compositions of this type and can be chosen such that the additive(s) are selected so as to not significantly adversely affect the desired properties of the polymer, for example, transparency. Such additives can be mixed at a suitable time during the mixing of the components for forming articles made from the polymers. Exemplary additives include impact modifiers, fillers, reinforcing agents, antioxidants, heat stabilizers, light stabilizers, ultraviolet (UV) light stabilizers (e.g., UV absorbing), plasticizers, lubricants, mold release agents, antistatic agents, colorants (such as carbon black and organic dyes), surface effect additives, infrared radiation stabilizers (e.g., infrared absorbing), flame retardants, thermal conductivity enhancers, and anti-drip agents. A combination of additives can be used, for example a combination of a heat stabilizer, mold release agent, and ultraviolet light stabilizer. In general, the additives are used in the amounts generally known to be effective. The total amount of additives (other than any impact modifier, filler, or reinforcing agents) is generally 0.001 to 30 weight percent (wt %), based on the total weight of the composition. In one embodiment, optionally, fibers (e.g., carbon, ceramic, or metal) can be incorporated into the polymer to enhance thermal conductivity, subject to compatibility with optical and/or aesthetic requirements.

A weathering layer can be applied to one or both of an external and an internal surface of the enclosure. For example, the weathering layer can be a coating having a thickness of less than or equal to 100 micrometers (μm). The weathering layer can be a coating having a thickness of 4 μm to 65 μm. The weathering layer can be applied by various means, including dipping the plastic substrate in a coating solution at room temperature and atmospheric pressure (i.e., dip coating). The weathering layer can also be applied by other methods including, but not limited to, flow coating, curtain coating, and spray coating. The weathering layer can include silicones (e.g., a silicone hard coat), polyurethanes (e.g., polyurethane acrylate), acrylics, polyacrylate (e.g., polymethacrylate, polymethyl methacrylate), polyvinylidene fluoride, polyesters, epoxies, and combinations comprising at least one of the foregoing. The weathering layer can include ultraviolet absorbing molecules (e.g., such as hydroxyphenylthazine, hydroxybenzophenones, hydroxylphenylbenzothazoles, hydroxyphenyltriazines, polyaroylresorcinols, and cyanoacrylate, as well as combinations comprising at least one of the foregoing). For example, the weathering layer can include a silicone hard coat layer (such as AS4000 or AS4700, commercially available from Momentive Performance Materials). The weathering layer can include an acrylic UV-curable hard coat (such as UVHC3000K or UVHC5000, commercially available from Momentive Performance Materials).

The weathering layer can include a primer layer and a coating (e.g., a top coat). A primer layer can aid in adhesion of the weathering layer to the enclosure. The primer layer can include, but is not limited to, acrylics, polyesters, epoxies, and combinations comprising at least one of the foregoing. The primer layer can also include ultraviolet absorbers in addition to or in place of those in the top coat of the weathering layer. For example, the primer layer can include an acrylic primer (SHP401 or SHP470, commercially available from Momentive Performance Materials).

An abrasion resistant layer (e.g., a coating or plasma coating) can be applied to one or both of an internal and external surface of the enclosure. Optionally, a weathering layer can be located between the abrasion resistant layer and an external surface of the enclosure. The abrasion resistant layer can include a single layer or a multitude of layers and can add enhanced functionality by improving abrasion resistance of the enclosure. Generally, the abrasion resistant layer can include an organic coating and/or an inorganic coating such as, but not limited to, aluminum oxide, barium fluoride, boron nitride, hafnium oxide, lanthanum fluoride, magnesium fluoride, magnesium oxide, scandium oxide, silicon monoxide, silicon dioxide, silicon nitride, silicon oxy-nitride, silicon carbide, silicon oxy carbide, hydrogenated silicon oxy-carbide, tantalum oxide, titanium oxide, tin oxide, indium tin oxide, yttrium oxide, zinc oxide, zinc selenide, zinc sulfide, zirconium oxide, zirconium titanate, glass, and combinations comprising at least one of the foregoing.

The abrasion resistant layer can be applied by various deposition techniques such as vacuum assisted deposition processes and atmospheric coating processes. For example, vacuum assisted deposition processes can include, but are not limited to, plasma enhanced chemical vapor deposition (PECVD), arc-PECVD, expanding thermal plasma PECVD, ion assisted plasma deposition, magnetron sputtering, electron beam evaporation, and ion beam sputtering.

An anti-fog layer or an anti-fog treatment can be applied to at least one of an external surface, the internal inhibiting surface, and the internal condensing surface to further discourage condensation or to inhibit condensation in the form of water droplets. For example, the anti-fog layer or anti-fog treatment can decrease or increase the propensity for water to condense on the surface by either making the surface more hydrophobic or more hydrophilic as can be determined by, for example, determining a change in the contact angle of a water droplet on the surface before and after the treatment. An anti-fog layer or an anti-fog treatment can be applied to the external inhibiting surface to further discourage condensation or to inhibit condensation in the form of water droplets on the external inhibiting surface. The anti-fog layer can be applied via an in-mold coating, a cap layer, or a film-insert-molded layer. It is noted that the lifetime of a hydrophilic anti-fog element (e.g., one or more of the anti-fog layer and anti-fog treatment) on an internal inhibiting surface can be increased relative to an anti-fog layer or anti-fog treatment that is located on a surface other than the inhibiting surface. This increase in lifetime arises from the fact that the anti-fog element generally experiences hydrolytic instability caused by condensation. Since the internal inhibiting surface experiences a reduction in condensation (relative to the same surface that is not an inhibiting surface) due to the presence of the condensing surface, there is a reduction in the exposure of the anti-fog element to water.

Optionally, one or more of the layers (e.g., weathering layer and/or abrasion resistant layer and/or an anti-fog layer) can be a film applied to one or both of an internal and an external surface of the enclosure by a method such as lamination or film insert molding or by a method as described above. For example, a co-extruded film, an extrusion coated, a roller-coated, or an extrusion-laminated film comprising greater than one layer can be used as an alternative to a hard coat (e.g., a silicone hard coat or an acrylic UV-curable hard coat) as previously described. The film can contain an additive or copolymer to promote adhesion of the weathering layer (i.e., the film) to an abrasion resistant layer, and/or can itself include a weatherable material such as an acrylic (e.g., polymethylmethacrylates), fluoropolymer (e.g., polyvinylidene fluoride, polyvinyl fluoride), etc., and/or can block transmission of ultraviolet radiation sufficiently to protect the underlying substrate; and/or can be suitable for film insert molding (FIM) (in-mold decoration (IMD)), extrusion, or lamination processing of a three dimensional shaped panel.

At least one of the components of the enclosure (such as the inhibiting element, the condensing element, a layer within an element, etc.) can each independently include an additive. The additive can include colorant(s), antioxidant(s), surfactant(s), plasticizer(s), infrared radiation absorber(s), antistat(s), antibacterial(s), flow additive(s), dispersant(s), compatibilizer(s), cure catalyst(s), ultraviolet radiation absorber(s), and combinations comprising at least one of the foregoing. The type and amounts of any additives added to the various elements and/or various layers depends on the desired performance and end use of the enclosure.

Exemplary PCMs include, but are not limited to, zeolite powder, polytriphenylphosphate, crystalline paraffin wax, polyethyleneglycol, fatty acid, naphthalene, calcium bichloride, polyepsilon caprolactone, polyethylene oxide, polyisobutylene, polycyclopentene, polycyclooctene, polycyclododecene, polyisoprene, polyoxytriethylene, polyoxytetramethylene, polyoxyoctamethylene, polyoxypropylene, polybutyrolactone, polyvalerolactone, polyethyleneadipate, polyethylene suberate, polydecamethylazelate, and combinations comprising at least one of the foregoing.

The PCM can be implemented in various forms, including, but not limited to discretely encapsulated PCM particles with diameters of a few micrometers or as a shape-stabilized PCM where a PCM in its solid or liquid phase is fully contained by a supporting structure such as a polymeric matrix. The encapsulant can, for example, include a microsphere (e.g., with glass or polymer as the encapsulant). In such a case, the PCM can be discretely encapsulated by the microsphere. The PCM can be incorporated into the polymer in various locations, including, but not limited to, incorporation in a first shot and/or a second shot for two-shot injection molded components. For example, PCM incorporated into the first and second shots can include PCMs with different respective forms (e.g., discretely encapsulated PCM particles or shape-stabilized PCM particles), and/or sizes, and/or materials, and/or loadings. When incorporating a PCM into the second shot in a two-shot injection molding process, where the second shot can generally be opaque or relatively dark, the loading, and/or size, and/or material, and/or form of the PCM in the second shot would not be limited by specifications for optical transmission and/or haze.

When an element includes a polymer and a PCM, the refractive index of the polymer and the refractive index of the PCM can be substantially equal so that there is no substantial change in the transparency of the material. For example, for use in lamp enclosures, when a PCM is incorporated into an inhibiting element, such as a lens, the refractive indexes of the polymer and the PCM can be substantially equal. Substantially equal can mean that the values of the refractive indices are within 10% of one another. Substantially equal can mean that the values of the refractive indices are within 5% of one another. Substantially equal can mean that the values of the refractive indices are within 2.5% of one another.

When an element includes a PCM, the element can further include a thermal conductivity enhancer (TCE) to increase the thermal conductivity of the material in which the TCE is located. The TCE can include metal, metal oxide, ceramic, carbon (such as carbon fibers), carbon phases, silica, metal silicon, or a combination comprising one or more of the foregoing. Exemplary metals include but are not limited to aluminum, magnesium, tungsten, copper, nickel, gold, silver, alloys thereof such as steel, and combinations comprising at least one of the foregoing. Exemplary metal oxides include but are not limited to cupric oxide, gold, silver, and palladium oxides, and combinations comprising at least one of the foregoing. Exemplary thermally conductive ceramics include but are not limited to aluminum nitride, beryllium oxide, boron nitride, high conductivity cermets, cuprates, and silicides, and combinations comprising at least one of the foregoing. Exemplary carbon and carbon phases include but are not limited to diamond, carbon nano-tubes, related derivatives, and combinations comprising at least one of the foregoing. The TCE can be coated e.g., aluminum coated copper. The TCE can be utilized in forms such as those of a powder, a fine powder, fibers, nano-tubes, or combinations comprising at least one of the foregoing. Fibers can be in various forms such as fins, honeycomb, wool, brush, etc.

Methods of making the enclosure disclosed herein are also contemplated. For example, a method of making the enclosure can include molding an inhibiting element; molding a condensing element; and combining the elements to form the enclosure. A PCM can be added into at least one of said elements and/or can be added into a discrete layer in direct contact with an internal side of at least one of said elements.

A method of forming the enclosure can comprise forming a wall comprising the inhibiting element; forming another wall comprising the condensing element; and orienting the walls to form the enclosure. At least one of the forming can include adding the PCM to a polymer and forming at least one of the condensing element and the inhibiting element. The method can include thoroughly mixing the PCM and optionally a thermal conductivity enhancer in a polymer such that the PCM is uniformly distributed throughout the polymer.

The enclosure can be designed such that there is a low thermal conductance between the condensing surface and the inhibiting surface in order to promote the temperature differential between the two surfaces.

The following examples are provided to illustrate the different propensities for condensation on surfaces of different temperatures. The examples are merely illustrative and are not intended to limit devices made in accordance with the disclosure to the materials, conditions, or process parameters set forth therein.

EXAMPLES

A transparent panel with a panel side A and a panel side B with a thickness of 4 mm separated two enclosed spaces: A and B, where panel side A was exposed to enclosed space A and panel side B was exposed to enclosed space B. Enclosed space A contained circulating non-humidified air maintained at a temperature of 0° C. Enclosed space B, representing an enclosure, contained circulating air maintained at a temperature of 24° C. with a controlled relative humidity (RH). A temperature sensor determined the temperature at a central location on panel side B. The relative humidity was determined in the enclosed space B at both the moment of the incipience of condensation and the moment when the condensation attained a fully developed state in the vicinity of the temperature sensor. The condensation was monitored via an optical detector. The experiment was performed with a glass panel (Example 1) and a polycarbonate panel (Example 2). Table 1 shows the temperature of panel side B, the RH at which condensation is incipient ($RH_i$), the RH at which condensation is fully developed ($RH_f$), and the transparency of the panel where condensation is fully developed ($T_f$) for both Examples 1 and 2.

TABLE 1

| Example | 1 | 2 |
|---|---|---|
| Panel Material | Glass | Polycarbonate |
| Temperature (° C.) | 12.4 | 17.2 |
| $RH_i$ (%) | 43.7 | 53.4 |
| $RH_f$ (%) | 48.8 | 58.5 |
| $T_f$ (%) | 27 | 47 |

Table 1 shows a 4.8° C. temperature difference between panel side B of the glass and polycarbonate panels. This temperature difference is due to the five-fold lower thermal conductivity of the polycarbonate panel and yields nearly ten-unit higher values of both $RH_i$ and $RH_f$ on the warmer surface, which is manifested by the polycarbonate panel. That is, over a nearly ten-unit span of RH, condensation was observed only on the cooler surface. Since the source of the surface temperature difference is not relevant to the condensation process, a PCM-induced temperature difference would likewise generate a significant difference in propensity for condensation on the present inhibiting surfaces and the present condensing surfaces.

Set forth below are some embodiments of the present enclosure and method of reducing condensation:

Embodiment 1

An enclosure comprising: walls forming the enclosure, wherein the enclosure comprises an internal space; an inhibiting element disposed in at least one wall, the inhibiting element having an internal inhibiting surface exposed to the internal space, wherein the inhibiting element has a luminous transmittance of greater than or equal to 20% as determined in accordance with ASTM D1003-11, Procedure A using CIE standard illuminant C; and a condensing element disposed in at least one other wall, the condensing element having an internal condensing surface exposed to the internal space; wherein at least one of the inhibiting element and the condensing element comprise a phase change material configured to form a temperature differential between an internal inhibiting surface temperature and an internal condensing surface temperature over a temperature range, and wherein when the temperature differential is formed, the internal inhibiting surface temperature is greater than the internal condensing surface temperature.

Embodiment 2

The enclosure of Embodiment 1, wherein the condensing element comprises the phase change material and the inhibiting element is free of the phase change material, or wherein the inhibiting element comprises the phase change material and the condensing element is free of the phase change material.

Embodiment 3

The enclosure of Embodiment 1, wherein the inhibiting element comprises an inhibiting element phase change material and the condensing element comprises a condensing element phase change material, and wherein the inhibiting element phase change material has a higher phase change temperature than the condensing element phase change material.

Embodiment 4

The enclosure of any of Embodiments 1-3, wherein the inhibiting element comprises an inhibiting element phase change material, and wherein the inhibiting element phase change material has an inhibiting phase change temperature of greater than 0° C., or is in the range of 5° C. to 25° C., or is in the range of 10° C. to 20° C.

Embodiment 5

The enclosure of any of Embodiments 1-3, wherein the condensing element comprises a condensing element phase change material, and wherein the condensing element phase change material has a condensing phase change temperature of less than 25° C., or is in the range of 0° C. to 20° C., or is in the range of 5° C. to 15° C.

Embodiment 6

The enclosure of any of the preceding Embodiments, wherein the phase change material is uniformly distributed throughout at least one of the condensing element and the inhibiting element.

Embodiment 7

The enclosure of any of the preceding Embodiments, wherein the phase change material is non-uniformly distributed throughout at least one of the condensing element such that greater than 75 wt % of the phase change material is located closer to the internal condensing surface than to a condensing element external surface; and the inhibiting element such that greater than 75 wt % of the phase change material is located closer to the internal inhibiting surface than to an inhibiting element external surface.

Embodiment 8

The enclosure of any of the preceding Embodiments, wherein at least one of the condensing element and the inhibiting element comprises a first layer and a discrete phase change material layer, wherein the discrete phase change material layer comprises the phase change material.

Embodiment 9

The enclosure of Embodiment 8, wherein the discrete phase change material layer is thermally coupled to the first layer.

Embodiment 10

The enclosure of any of the preceding Embodiments, wherein the phase change material comprises zeolite powder, polytriphenylphosphate, crystalline paraffin wax, polyethyleneglycol, fatty acid, naphthalene, calcium bichloride, polyepsilon caprolactone, polycyclene oxide, polyisobutylene, polycyclopentene, polycyclooctene, polycyclododecene, polyisoprene, polyoxytriethylene, polyoxytetramethylene, polyoxyoctamethylene, polyoxypropylene, polybutyrolactone, polyvalerolactone, polyethyleneadipate, polyethylene suberate, polydecamethylazelate, or a combination comprising at least one of the foregoing.

Embodiment 11

The enclosure of any of the preceding Embodiments, wherein the phase change material comprises shape-stabilized phase change material particles.

Embodiment 12

The enclosure of any of the preceding Embodiments, wherein the phase change material comprises discretely encapsulated phase change material particles.

Embodiment 13

The enclosure of any of the preceding Embodiments, wherein at least one of the condensing element and the inhibiting element comprises a polymer and the phase change material, and wherein a refractive index of the polymer and a refractive index of the phase change material are within 10% of one another.

Embodiment 14

The enclosure of any of the preceding Embodiments, wherein at least one of the condensing element and the inhibiting element comprises the phase change material and further comprises a thermal conductivity enhancer.

Embodiment 15

The enclosure of Embodiment 14, wherein the thermal conductivity enhancer comprises metal, metal oxide, carbon, silica, metal silicon, or a combination comprising one or more of the foregoing.

Embodiment 16

The enclosure of any of the preceding Embodiments, wherein the internal inhibiting surface has an anti-fog layer located thereon.

Embodiment 17

The enclosure of any of the preceding Embodiments, wherein the enclosure is an element of a visible light illumination device.

Embodiment 18

The enclosure of any of the preceding Embodiments, wherein the inhibiting element is a lens.

Embodiment 19

The enclosure of any of the preceding Embodiments, wherein the inhibiting surface and the condensing surface each independently span greater than or equal to 50% of the internal surface area of the inhibiting element and the condensing elements, respectively.

Embodiment 20

The enclosure of any of the preceding Embodiments, wherein the inhibiting surface and the condensing surface each independently span greater than or equal to 80% of the internal surface area of the inhibiting element and the condensing elements, respectively.

Embodiment 21

The enclosure of any of the preceding Embodiments, has a luminous transmittance of greater than or equal to 50% or greater than or equal to 80%.

Embodiment 22

A method of directing a condensation in the enclosure of any of the preceding Embodiments, comprising: creating a temperature differential between the internal inhibiting surface and the internal condensing surface.

Embodiment 23

A method of forming the enclosure of any of Embodiments 1-21, comprising: forming the wall comprising the inhibiting element; forming the other wall comprising the condensing element; and orienting the walls to form the enclosure.

Embodiment 24

The method of Embodiment 23, wherein at least one of the forming comprises adding the phase change material to a polymer and forming at least one of the condensing element and the inhibiting element.

Embodiment 25

A visible light illuminating device, comprising: the enclosure of any of Embodiments 1-21, wherein the wall comprising the inhibiting element is a lens, wherein the enclosure comprises a bezel portion and a housing portion, and wherein at least one of the bezel portion and the housing portion comprise the condensing element; an electrical connection configured to provide electricity to a light source and wiring connected to the light source and configured to provide electricity to the light source, and optionally comprising a reflector, wherein the light source is in optical communication with the reflector. The electrical connection can comprise a socket and/or pins.

Embodiment 26

A lamp enclosure, comprising: a bezel; a socket configured to receive a lamp; a reflector coupled with the bezel and positioned to reflect light from the lamp; and a lens coupled to the bezel; wherein at least one of the bezel and the lens includes a phase change material.

Embodiment 27

A lamp enclosure, comprising: a bezel; a first lens coupled to the bezel; and an optional second lens coupled to the bezel, wherein the bezel extends around a perimeter of both of the first lens and the optional second lens, and wherein at least one of the bezel and the first lens includes a phase change material.

Embodiment 28

The enclosure of Embodiments 26 and 27, wherein the lamp enclosure is the enclosure of any of Embodiments 1-21, and wherein the bezel comprises the condensing element, and the lens comprises the inhibiting element.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

All ranges disclosed herein are inclusive of the endpoints, and the endpoints are independently combinable with each other (e.g., ranges of "up to 25 wt %, or, more specifically, 5 to 20 wt %", is inclusive of the endpoints and all intermediate values of the ranges of "5 to 25 wt %," etc.). "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment," "another embodiment," "an embodiment," and so forth, means that a particular element (e.g., feature, structure, and/or characteristic) described in connection with the embodiment is included in at least one embodiment described herein, and may or may not be present in other embodiments. "Or" means "and/or." In addition, it is to be understood that the described elements may be combined in any suitable manner in the various embodiments.

While particular embodiments have been described, alternatives, modifications, variations, improvements, and substantial equivalents that are or may be presently unforeseen may arise to Applicants or others skilled in the art. Accordingly, the appended claims as filed and as they may be amended are intended to embrace all such alternatives, modifications variations, improvements, and substantial equivalents.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. In addition, it is to be understood that the described elements may be combined in any suitable manner in the various embodiments.

With respect to the figures, it is noted that these figures (also referred to herein as "FIG.") are merely schematic representations based on convenience and the ease of demonstrating the present disclosure, and are, therefore, not intended to indicate relative size and dimensions of the devices or components thereof and/or to define or limit the scope of the exemplary embodiments. Although specific terms are used in the description for the sake of clarity, these terms are intended to refer only to the particular structure of the embodiments selected for illustration in the drawings, and are not intended to define or limit the scope of the disclosure. In the drawings and the description herein, it is to be understood that like numeric designations refer to components of like function.

Disclosure of a narrower range in addition to a broader range is not a disclaimer of the broader range. Unless defined otherwise, technical and scientific terms used herein have the same meaning as is commonly understood by one of skill in the art to which this invention belongs. "Optional" or "optionally" means that the subsequently described event or circumstance can or cannot occur, and that the description includes instances where the event occurs and instances where it does not.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

I claim:

1. An enclosure comprising:
   walls forming the enclosure, wherein the enclosure comprises an internal space;
   an inhibiting element disposed in at least one wall, the inhibiting element having an internal inhibiting surface exposed to the internal space, wherein the inhibiting element has a transparency of greater than or equal to 20% as determined in accordance with ASTM D1003-11, Procedure A using CIE standard illuminant C; and
   a condensing element disposed in at least one other wall, the condensing element having an internal condensing surface exposed to the internal space;
   wherein at least one of the inhibiting element and the condensing element comprises a phase change material configured to form a temperature differential between an internal inhibiting surface temperature and an internal condensing surface temperature over a temperature range, and wherein when the temperature differential is formed, the internal inhibiting surface temperature is greater than the internal condensing surface temperature.

2. The enclosure of claim 1, wherein the condensing element comprises the phase change material and the inhibiting element is free of the phase change material, or wherein the inhibiting element comprises the phase change material and the condensing element is free of the phase change material.

3. The enclosure of claim 1, wherein the inhibiting element comprises an inhibiting element phase change material and the condensing element comprises a condensing element phase change material, and wherein the inhibiting element phase change material has a higher phase change temperature than the condensing element phase change material.

4. The enclosure of claim 1, wherein the inhibiting element comprises an inhibiting element phase change material, and wherein the inhibiting element phase change material has an inhibiting phase change temperature of greater than 0° C.

5. The enclosure of claim 1, wherein the condensing element comprises a condensing element phase change material, and wherein the condensing element phase change material has a condensing phase change temperature of less than 25° C.

6. The enclosure of claim 1, wherein the phase change material is non-uniformly distributed throughout at least one of
the condensing element such that greater than 75 wt % of the phase change material is located closer to the internal condensing surface than to a condensing element external surface; and
the inhibiting element such that greater than 75 wt % of the phase change material is located closer to the internal inhibiting surface than to an inhibiting element external surface.

7. The enclosure of claim 1, wherein the phase change material comprises zeolite powder, polytriphenylphosphate, crystalline paraffin wax, polyethyleneglycol, fatty acid, naphthalene, calcium bichloride, polyepsilon caprolactone, polyethylene oxide, polyisobutylene, polycyclopentene, polycyclooctene, polycyclododecene, polyisoprene, polyoxytriethylene, polyoxytetramethylene, polyoxyoctamethylene, polyoxypropylene, polybutyrolactone, polyvalerolactone, polyethyleneadipate, polyethylene suberate, polydecamethylazelate, or a combination comprising at least one of the foregoing.

8. The enclosure of claim 1, wherein the phase change material comprises at least one of shape-stabilized phase change material particles and discretely encapsulated phase change material particles.

9. The enclosure of claim 1, wherein at least one of the condensing element and the inhibiting element comprises a polymer and the phase change material, and wherein a refractive index of the polymer and a refractive index of the phase change material are within 10% of one another.

10. The enclosure of claim 1, wherein at least one of the condensing element and the inhibiting element comprises the phase change material and further comprises a thermal conductivity enhancer; and wherein the thermal conductivity enhancer comprises metal, metal oxide, carbon, silica, metal silicon, or a combination comprising one or more of the foregoing.

11. The enclosure of claim 1, wherein the internal inhibiting surface has an anti-fog layer located thereon.

12. The enclosure of claim 1, wherein the enclosure is an element of a visible light illumination device and/or wherein the inhibiting element is a lens.

13. A method of directing a condensation in the enclosure of claim 1, comprising: creating a temperature differential between the internal inhibiting surface and the internal condensing surface.

14. A method of forming the enclosure of claim 1, comprising:
forming the wall comprising the inhibiting element;
forming the other wall comprising the condensing element; and
orienting the walls to form the enclosure.

15. The method of claim 14, wherein at least one of the forming comprises adding the phase change material to a polymer and forming at least one of the condensing element and the inhibiting element.

16. A visible light illuminating device, comprising:
the enclosure of any of claim 1, wherein the wall comprising the inhibiting element is a lens, wherein the enclosure comprises a housing portion and a bezel portion, and wherein at least one of the housing portion and the bezel portion comprise the condensing element;
an electrical connection configured to electrically connect with a light source; and
wiring connected to the electrical connection and configured to provide electricity to the light source.

17. The enclosure of claim 1, wherein the condensing element is a bezel and wherein the inhibiting element is a lens.

18. The enclosure of claim 1, wherein the phase change material forms the temperature differential by undergoing a solid to liquid phase change or a liquid to solid phase change.

* * * * *